(12) United States Patent
Yanai et al.

(10) Patent No.: US 11,812,365 B2
(45) Date of Patent: Nov. 7, 2023

(54) SYSTEM AND METHOD THEREFOR

(71) Applicant: NEC Corporation, Tokyo (JP)

(72) Inventors: Masaru Yanai, Tokyo (JP); Hiroaki Aminaka, Tokyo (JP); Tetsuo Fujii, Tokyo (JP)

(73) Assignee: NEC CORPORATION, Tokyo (JP)

(*) Notice: Subject to any disclaimer, the term of this patent is extended or adjusted under 35 U.S.C. 154(b) by 87 days.

(21) Appl. No.: 17/439,475

(22) PCT Filed: Mar. 5, 2020

(86) PCT No.: PCT/JP2020/009489
§ 371 (c)(1),
(2) Date: Sep. 15, 2021

(87) PCT Pub. No.: WO2020/195686
PCT Pub. Date: Oct. 1, 2020

(65) Prior Publication Data
US 2022/0167248 A1 May 26, 2022

(30) Foreign Application Priority Data
Mar. 22, 2019 (JP) .................................. 2019-055095

(51) Int. Cl.
*H04W 48/06* (2009.01)
*H04W 4/90* (2018.01)
*H04W 48/18* (2009.01)

(52) U.S. Cl.
CPC ............ *H04W 48/06* (2013.01); *H04W 4/90* (2018.02); *H04W 48/18* (2013.01)

(58) Field of Classification Search
CPC ....... H04W 48/06; H04W 4/90; H04W 48/18; H04W 28/08; H04W 88/18
(Continued)

(56) References Cited

U.S. PATENT DOCUMENTS

| 2013/0073710 | A1  | 3/2013 | Lee |
|---|---|---|---|
| 2014/0280973 | A1* | 9/2014 | Clancy, III ............ H04W 72/54 709/226 |
| 2020/0022211 | A1  | 1/2020 | Aminaka |

FOREIGN PATENT DOCUMENTS

| JP | 2013-537775 A   | 10/2013 |
|----|-----------------|---------|
| JP | 2015-204592 A   | 11/2015 |
| WO | 2018/109986 A1  | 6/2018  |

OTHER PUBLICATIONS

International Search Report for PCT Application No. PCT/JP2020/009489, dated Jun. 9, 2020.
(Continued)

*Primary Examiner* — Huy C Ho
(74) *Attorney, Agent, or Firm* — Sughrue Mion, PLLC

(57) ABSTRACT

One or more servers (11) communicate with one or more applications running on each of a plurality of wireless terminals (2) via a first or second cellular communication network (3, 4). Depending on a load of the first cellular communication network, the one more servers (11) select from the first and second cellular communication networks (3, 4) a cellular communication network to be used by each wireless terminal (2) to communicate with the one more servers (11). The one more servers (11) send to each wireless terminal (2) a control message to prompt each wireless terminal (2) to use the selected network. This for example makes it possible to select among a plurality of cellular communication networks in consideration of load status of the cellular communication networks.

20 Claims, 7 Drawing Sheets

(58) Field of Classification Search
USPC .......................................................... 370/329
See application file for complete search history.

(56) References Cited

OTHER PUBLICATIONS

3GPP TS 23.179 V13.5.0 (Mar. 2017), "3rd Generation Partnership Project; Technical Specification Group Services and System Aspects; Functional architecture and information flows to support mission critical communication services; Stage 2 (Release 13)", Mar. 2017, pp. 1-229.
3GPP TS 23.468 V15.0.0 (Dec. 2017), "3rd Generation Partnership Project; Technical Specification Group Services and System Aspects; Group Communication System Enablers for LTE (GCSE_LTE); Stage 2 (Release 15)", Dec. 2017, pp. 1-32.

* cited by examiner

SYSTEM AND METHOD THEREFOR

This application is a National Stage Entry of PCT/JP2020/009489 filed on Mar. 5, 2020, which claims priority from Japanese Patent Application 2019-055095 filed on Mar. 22, 2019, the contents of all of which are incorporated herein by reference, in their entirety.

TECHNICAL FIELD

The present disclosure relates to wireless communication, and in particular to selection among cellular communication networks.

BACKGROUND ART

It is being considered to use a Long Term Evolution (LTE) network for a public safety network. The public safety network is a wireless communication network used for emergency services such as police, firefighting, and medical emergency, as well as highly public applications such as local governments and electric power, gas, and water utilities. The LTE system for public safety networks is called Public Safety LTE (PS-LTE). The Third Generation Partnership Project (3GPP) defines Mission Critical Push-to-Talk (MCPTT), which is one of the main features of PS-LTE (see, for example, Non-Patent Literature 1). The MCPTT architecture uses the aspects of the Group Communication System for LTE (GCSE_LTE) architecture, and also the aspects of the IP Multimedia Subsystem (IMS) architecture and the Proximity-based Services (ProSe) architecture. The GCSE_LTE enables group communication (see, for example, Non-Patent Literature 2).

It can be said that the PS-LTE network or system is a collection of hardware entities that provide applications, services, capabilities, and functions required to provide public safety services on an LTE network. The PS-LTE network or system may be a public LTE network (Public Land Mobile Network (PLMN)), a private LTE network, or a combination thereof.

The PS-LTE provides public safety services such as a PTT service. The PTT service is a Push To Talk communication service supporting applications for Mission Critical Organizations and for other businesses and organizations (e.g., public utilities and railways) with fast setup times, high availability, and reliability and priority handling. The public safety organizations include, for example, local police departments and local fire departments.

A user (e.g., PTT user) who uses a public safety service (e.g., PTT service) uses a wireless terminal or device (e.g., PS User Equipment (UE)) which has the capability to participate in the public safety service. Such devices (e.g., PS UE) allow users to participate in public safety services. Public safety service users include, for example, police officers and firefighters.

A public safety service provider is authorized to control parameters of the public safety service (e.g., PTT service) provided to a public safety organization. These parameters include, for example, user and group definition, user priorities, group membership/priorities/hierarchies, and security and privacy controls. A public safety service provider can also be referred to as a public safety service administrator.

The business relationships of public safety service users, public safety organizations, and public safety service providers are as follows. A public safety service user belongs to a single public safety organization based on a user agreement. The public safety organization receives a public safety service from a public safety service provider based on an agreement. The public safety service user can have a user contract and service arrangement direct with the public safety service provider. The public safety organization and the public safety service provider can be part of the same organization. Further or alternatively, the public safety service provider and the PS-LTE network operator can be part of the same organization.

CITATION LIST

Non-Patent Literature

[Non-Patent Literature 1] 3GPP TS 23.179 V13.5.0 (2017 March), "3rd Generation Partnership Project; Technical Specification Group Services and System Aspects; Functional architecture and information flows to support mission critical communication services; Stage 2 (Release 13)", March 2017

[Non-Patent Literature 2] 3GPP TS 23.468 V15.0.0 (2017 December), "3rd Generation Partnership Project; Technical Specification Group Services and System Aspects; Group Communication System Enablers for LTE (GCSE_LTE); Stage 2 (Release 15)", December 2017

SUMMARY OF INVENTION

Technical Problem

The PS-LTE, which provides public safety services, may preferably be a private LTE network that is independent of public LTE networks. However, it may be difficult to ensure sufficient coverage with private LTE networks alone.

The inventors have studied using a public (or commercial) LTE infrastructure to complement the coverage of a public safety private LTE network and improve the connectivity of PS devices (i.e., UEs). In this case, the PS-LTE network or system uses both the private LTE network and the public (or commercial) LTE network and uses either or both of the two LTE networks for communication with each PS device (UE). In one scenario, the Mobile Virtual Network Operator (MVNO) approach may be used. Specifically, the PS-LTE network or system may rent part of a public LTE infrastructure of a Mobile Network Operator (MNO) and communicate with PS devices via the MNO's LTE network.

In the PS-LTE system that can use multiple LTE networks to communicate with multiple UEs, it is preferable that load status of one or more LTE networks is considered in selecting an LTE network to be used to communicate with each UE. One of the objects to be attained by embodiments disclosed herein is to provide apparatuses, methods, and programs that contribute to enabling a selection among a plurality of cellular communication networks in consideration of load status of the cellular communication networks. It should be noted that this object is merely one of the objects to be attained by the embodiments disclosed herein. Other objects or problems and novel features will be made apparent from the following description and the accompanying drawings.

Solution to Problem

In a first aspect, a system includes one or more servers. The one or more servers are configured to communicate with one or more applications running on each of a plurality of wireless terminals via a first cellular communication network or a second cellular communication network. In addition, the one or more servers are configured to, depending on a load of the first cellular communication network, select from the first and second cellular communication networks a cellular communication network to be used by each wireless terminal to communicate with the system. The one or more servers are further configured to send to each wireless terminal a control message to prompt each wireless terminal to use the selected network.

In a second aspect, a method performed by a system, including one or more servers, includes:
(a) communicating with one or more applications running on each of a plurality of wireless terminals via a first cellular communication network or a second cellular communication network;
(b) depending on a load of the first cellular communication network, selecting from the first and second cellular communication networks a cellular communication network to be used by each wireless terminal to communicate with the system; and
(c) sending to each wireless terminal a control message to prompt each wireless terminal to use the selected network.

In a third aspect, a program includes instructions (software codes) that, when loaded into a computer, cause the computer to perform the method according to the above-described second aspect.

Advantageous Effects of Invention

According to the above-described aspects, it is possible to provide apparatuses, methods, and programs that contribute to enabling a selection among a plurality of cellular communication networks in consideration of load status of the cellular communication networks.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Figure 1:
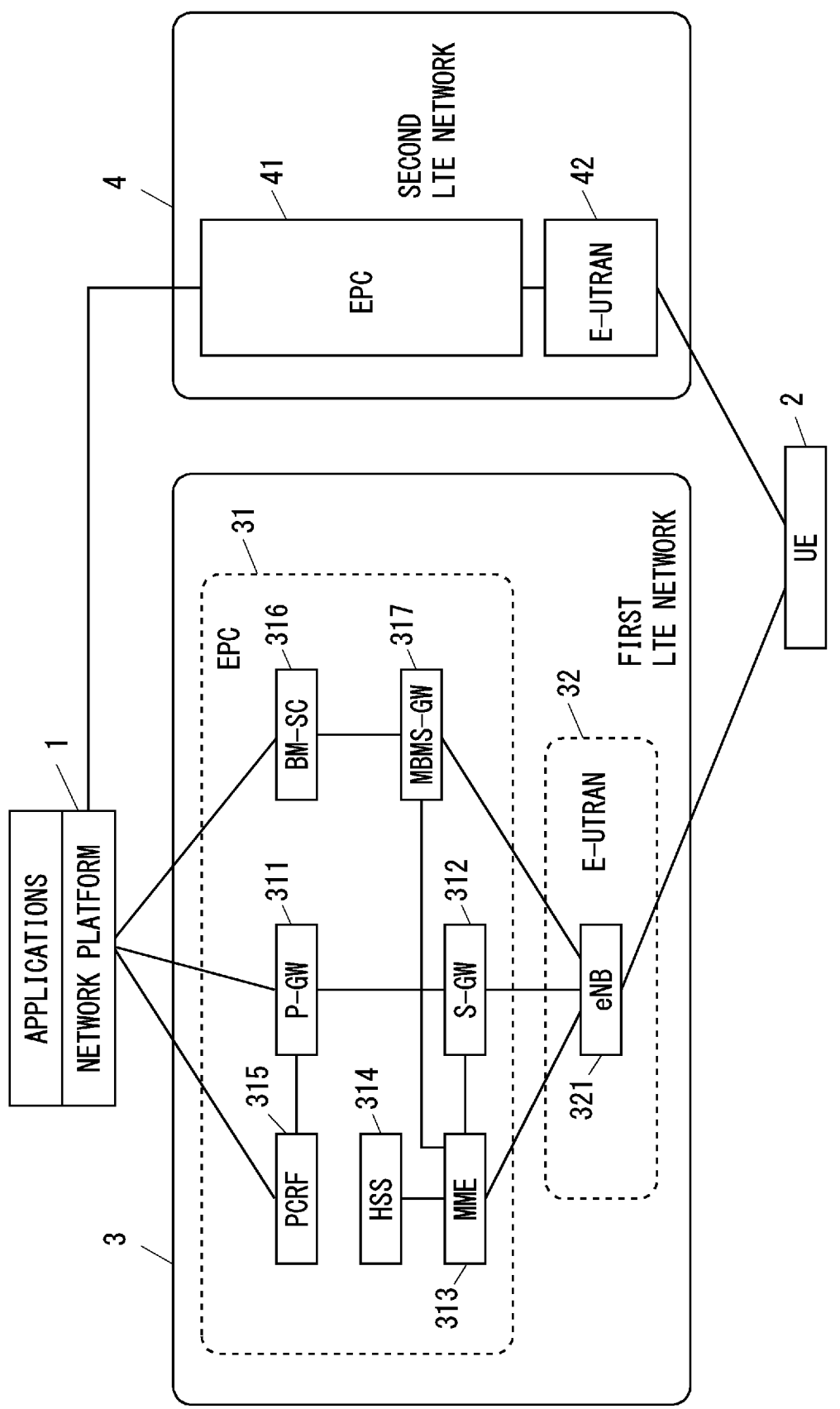
FIG. 1 is a block diagram showing a configuration example of a cellular communication network according to embodiments.

FIG. 1 shows a configuration example of a PS-LTE network or system according to embodiments including the present embodiment. The PS-LTE network or system provides one or more public safety services (e.g., a PTT service). In the example of FIG. 1, the PS-LTE network includes a network platform 1, a first LTE network 3, and a second LTE network. The network platform 1 communicates with one or more applications (e.g., a PTT client application and a Session Initiation Protocol (SIP) client application) running on each of a plurality of wireless terminals (UEs) 2 through one or more communication paths provided by the LTE network 3 or 4. In other words, the network platform 1 includes a plurality of functional entities in the application domain and communicates with the UEs 2 on the application layer (or application service layer). The UEs 2 are also referred to as public safety devices.

Figure 2:
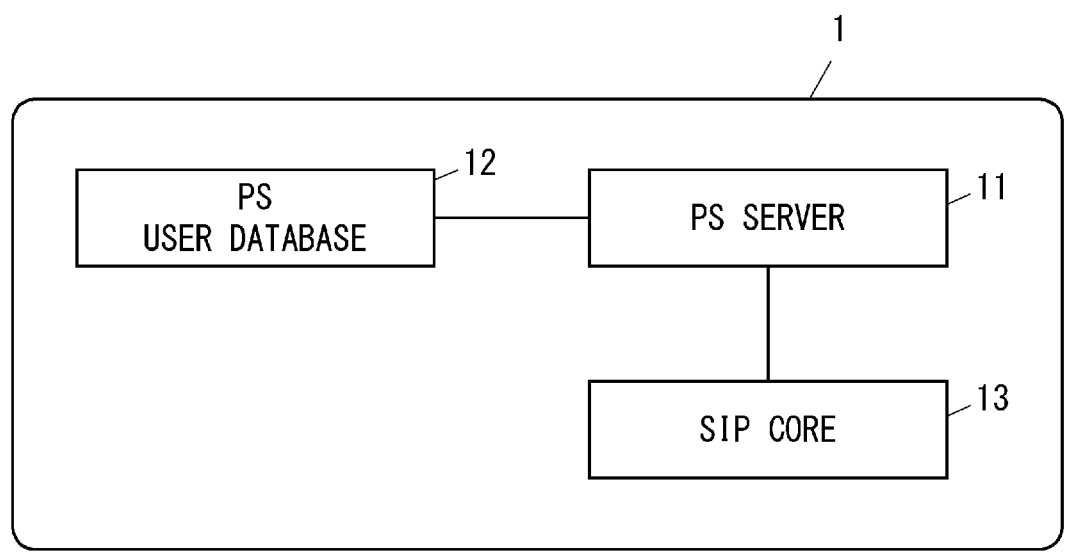
FIG. 2 is a block diagram showing a configuration example of a network platform according to embodiments.

The network platform 1 includes one or more servers. Each server included in the network platform 1 may be one or more computers. For example, as shown in FIG. 2, the network platform 1 may include a PS server 11, a PS user database 12, and a SIP core 13. The PS server 11 provides centralized support for a PS service (e.g., PTT service, push-to-video service). More specifically, the PS server 11 is responsible for, for example, PS user authentication, keeping tracking of the locations of the UEs 2 (PS UEs), and requesting the allocation of resources in the cellular communication network to the UEs 2. The PS server 11 may include the functions of a GCS application server (AS). The PS user database 12 stores information of PS user profiles. The PS user profile are determined by a public safety organization, a public safety service provider, and potentially a public safety service user. The SIP core 13 is in charge of SIP registration, establishes a SIP signaling bearer, and sends and receives SIP signaling messages to and from each UE 2 (SIP client on each UE 2). The PS user database 12 may be a device outside the network platform 1.

Further or alternatively, the network platform 1 may include other servers. The network platform 1 may include, for example, but not limited to, a GCS application server (AS) and/or a SIP database. The GCS AS uses an EPS bearer service or an MBMS bearer service, performing transfer or delivery of application signaling and application data to a group of UEs. The SIP database stores SIP subscriber information (SIP subscriptions) and authentication information that are required by the SIP core 13.

The LTE network 3 includes a core network (i.e., Evolved Packet Core (EPC)) 31 and a radio access network (i.e., Evolved Universal Terrestrial Radio Access Network (E-UTRAN)) 32. The EPC 31 includes a plurality of nodes, which include a plurality of control plane nodes and a plurality of user plane (or data plane) nodes. One or more nodes in the EPC 31 may have both control plane and user plane functions. For example, as shown in FIG. 1, the EPC 31 may include a Packet Data Network Gateway (P-GW) 311, a Serving Gateway (S-GW) 312, a Mobility Management Entity 313, a Home Subscriber Server (HSS) 314, a Policy and Charging Rules Function (PCRF) 315, a Broadcast Multicast Service Center (BM-SC) 316, and an MBMS Gateway (MBMS GW) 317. The E-UTRAN 32 includes a base station (eNodeB (eNB)) 321. Of course, although not explicitly shown in FIG. 1, the EPC 31 may include a plurality of S-GWs 312, and the E-UTRAN 32 may include a plurality of eNBs 321.

The second LTE network 4 includes an EPC 41 and an E-UTRAN 42. Although omitted in FIG. 1, the EPC 41 may include core network nodes similar to those in the EPC 31, and the E-UTRAN 42 may include RAN nodes similar to those in the E-UTRAN 32.

In some implementations, the first LTE network 3 may be a private LTE network specifically constructed for PS-LTE, while the second LTE network 4 may be a public or commercial LTE network. In this case, as described above, this may be an MVNO network that rents MNO infrastructure or resources.

In this embodiment, each UE 2 may use a plurality of communication modems and a plurality of Universal Integrated Circuit Cards (UICCs) (or Subscriber Identity Modules (SIM)) for the first LTE network 3 and the second LTE network 4 to connect simultaneously to the two LTE networks 3 and 4. Alternatively, each UE 2 may be configured to selectively connect to either of the two LTE networks 3 and 4.

Figure 3:
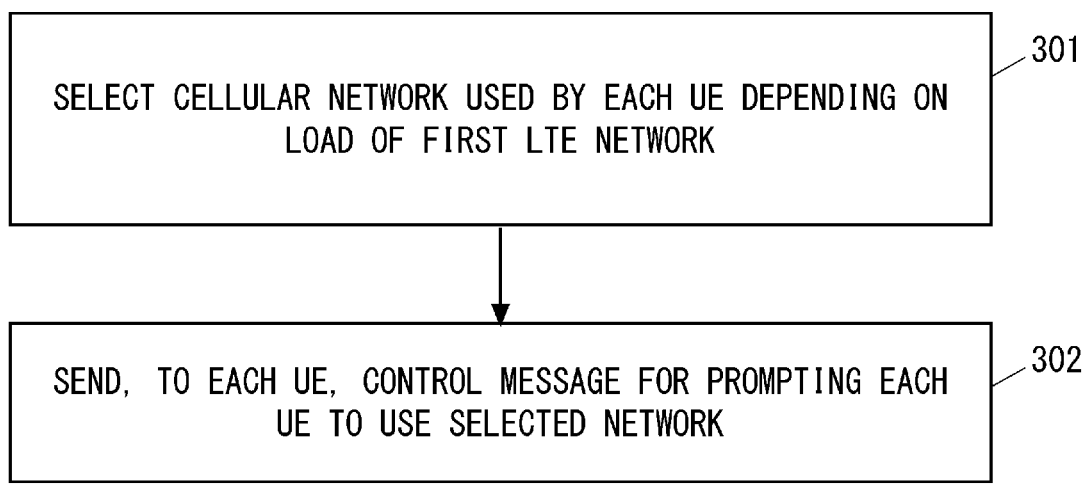
FIG. 3 is a flowchart showing an example of operation of a network platform according to a first embodiment.

FIG. 3 shows an example of an operation of the network platform 1 according to the present embodiment. The operation shown in FIG. 3 may be performed by a single server (e.g., the PS server 11) in the network platform 1 or by a plurality of servers (e.g., the PS server 11 and the PS user database 12).

In step 301, depending on a load of the first LTE network 3, the network platform 1 selects from the first and second LTE networks 3 and 4 a cellular communication network to be used by each UE 2 to communicate with the network platform 1.

The load of the first LTE network 3 may be a load of the E-UTRAN 32 or a load of the EPC 31. The load of the E-UTRAN 32 may be a load of the eNB 321 or a load on any cell provided by the eNB 321. The load of the E-UTRAN 32 may be related to the number of UEs of the eNB 321 or the cell, the number of connections (e.g., Radio Resource Control (RRC) connections) of the eNB 321 or the cell, or a radio resource usage amount (or rate) in the eNB 321 or the cell. The load of the EPC 31 may be a load of any EPC node (e.g., MME 313, P-GW 311). The load of the EPC 31 may be related to the number of UEs associated with the EPC node, the number of connections (e.g., PDN connections) associated with the EPC node, or the amount of user traffic associated with the EPC node.

The network platform 1 may acquire the load of the LTE network 3 from, for example, a monitoring system (e.g., an Element Management System (EMS)) of the LTE network 3.

In one example, the network platform 1 may select an LTE network used by each UE 2 so as to reduce a load of a heavily loaded cell, eNB, or EPC node. More specifically, for example, the network platform 1 may determine that one or more UEs 2 should use the second LTE network 4 when the EPC node in the first LTE network 3 is under heavy load.

Additionally or alternatively, when a certain cell or eNB 321 in the first LTE network 3 is under heavy load, the network platform 1 may determine that UEs 2 belonging to this cell or eNB 321 should use the second LTE network 4. In other words, in response to an increase in a load on a cell or eNB 321 in the first LTE network 3, the network platform 1 may determine that UEs 2 belonging to this cell or eNB 321 should use the second LTE network 4.

Additionally or alternatively, the network platform 1 may consider multiple load parameters (e.g., the number of UEs, the number of connections, and a radio resource utilization ratio, per eNB 321 or per cell) regarding the first LTE network, and if at least one of the load parameters exceeds a threshold, determine that one or more UEs 2 should use the second LTE network 4. The network platform 1 may move one or more UEs 2 belonging to the first LTE network 3 to the second LTE network 4.

Returning to FIG. 3, in step 302, the network platform 1 sends a control message to each UE 2 to prompt each UE 2 to use the network selected in step 301. This control message may specify the LTE network (i.e., LTE network 3 or 4) selected by network platform 1. Alternatively, the control message may indicate a network selection parameter used by each UE 2 to select an LTE network for communicating with the network platform 1 from the cellular communication networks 3 and 4.

The network selection parameter may be an offset value that when the UE 2 compares a radio quality of the first LTE network 3 with a radio quality of the second LTE network 4, is added to (or subtracted from) one of these two radio qualities. Alternatively, the network selection parameter may include two offset values to be added to (or subtracted from) these two radio qualities, respectively. The radio quality of the LTE network may be one or both of a cell reception level (i.e., signal strength) (e.g., Reference Signal Received Power (RSRP)) measured by the UE 2 and a cell quality level (i.e., signal quality) (e.g., Reference Signal Received Quality (RSRQ)) measured by the UE 2.

Figure 4:
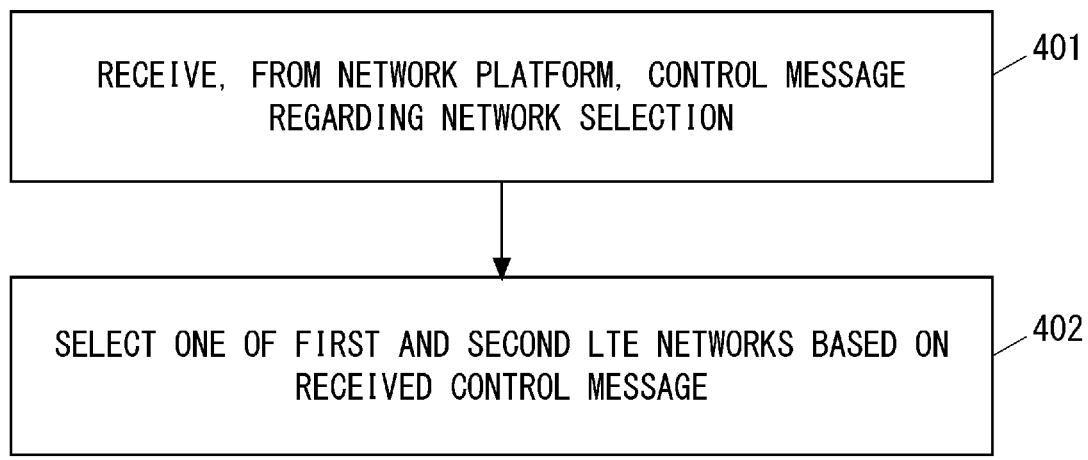
FIG. 4 is a flowchart showing an example of operation of a wireless terminal according to the first embodiment.

FIG. 4 shows an example of an operation of the UE 2 according to the present embodiment. In step 401, the UE 2 receives the above-described control message regarding the network selection from the network platform 1. In step 402, the UE 2 selects one of the first and second LTE networks 3 and 4 to communicate with the system 1 according to the received control message.

In some implementations, when the UE 2 has been attached to both the first and second LTE networks 3 and 4 (i.e., EMM-REGISTERED) and is in an idle mode (i.e., RRC_IDLE), it may perform the network selection to transition to a connected mode (i.e., RRC_CONNECTED). Further or alternatively, when the UE 2 has not yet been attached to either of the first and second LTE networks 3 and 4 (i.e., EMM-DEREGISTERED), it may perform the network selection to determine a network to attach. Further or alternatively, when the UE 2 is in a connected mode (i.e., RRC_CONNECTD) in the first LTE network 3, it may perform the network selection to move to the second LTE network 4.

According to the above-mentioned operations, the network platform 1 enables a selection between the LTE networks 3 and 4 in consideration of the load status of the LTE network 3. In other words, the network platform 1 can control the selection between the LTE networks 3 and 4 performed by the UE 2, based on the load status of the LTE network 3.

Second Embodiment

The present embodiment provides a modified example of the operations of the network platform 1 described in the first embodiment. A configuration example of a PS-LTE network according to the present embodiment is the same as that shown in FIGS. 1 and 2.

Figure 5:
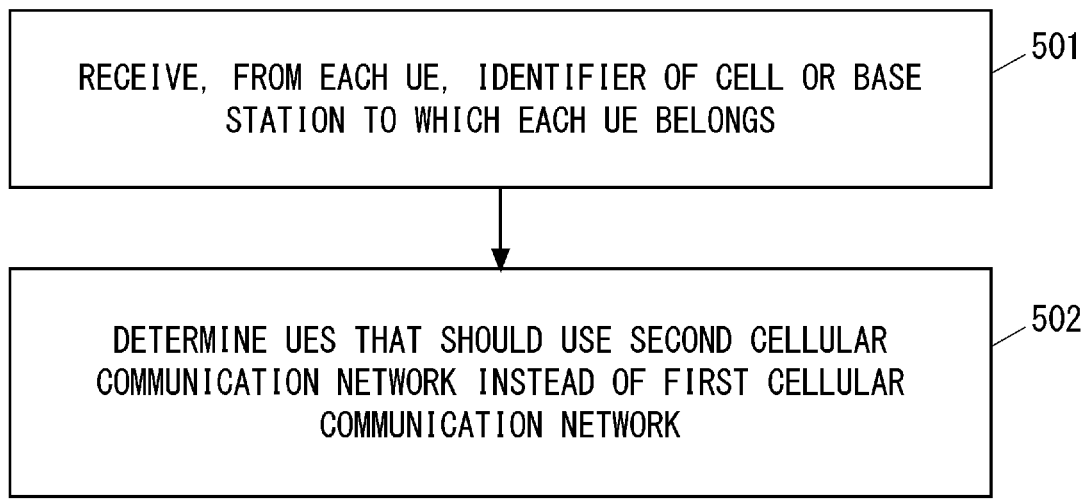
FIG. 5 is a flowchart showing an example of operation of a network platform according to a second embodiment.

FIG. 5 shows an example of an operation of the network platform 1 according to the present embodiment. The operation shown in FIG. 5 may be performed by a single server (e.g., the PS server 11) in the network platform 1 or by a plurality of servers (e.g., the PS server 11 and the PS user database 12).

In step 501, the network platform 1 receives from each of UEs 2 an identifier of a cell or eNB to which each UE 2 belongs. In step 502, based on the received identifiers, the network platform 1 determines one or more UEs 2 that should use the second LTE network 4 instead of the first LTE network 3.

The identifier of a cell or eNB may be, for example, an eNodeB identifier (eNB ID) or an E-UTRAN Cell Identifier (ECI).

In one example, the network platform 1 may receive the identifier of a cell or eNB to which the UE 2 belongs from the UE 2 when the UE 2 performs location registration (or location update) with the LTE network 3 or 4. Additionally or alternatively, the network platform 1 may periodically receive the identifier of a cell or eNB from the UE 2.

The above-mentioned operations allow the network platform 1 to track the positions of the UEs 2 at the cell level or base station level granularity and to perform more detailed control of the network selection according to the load condition of the LTE network 3.

Figure 6:
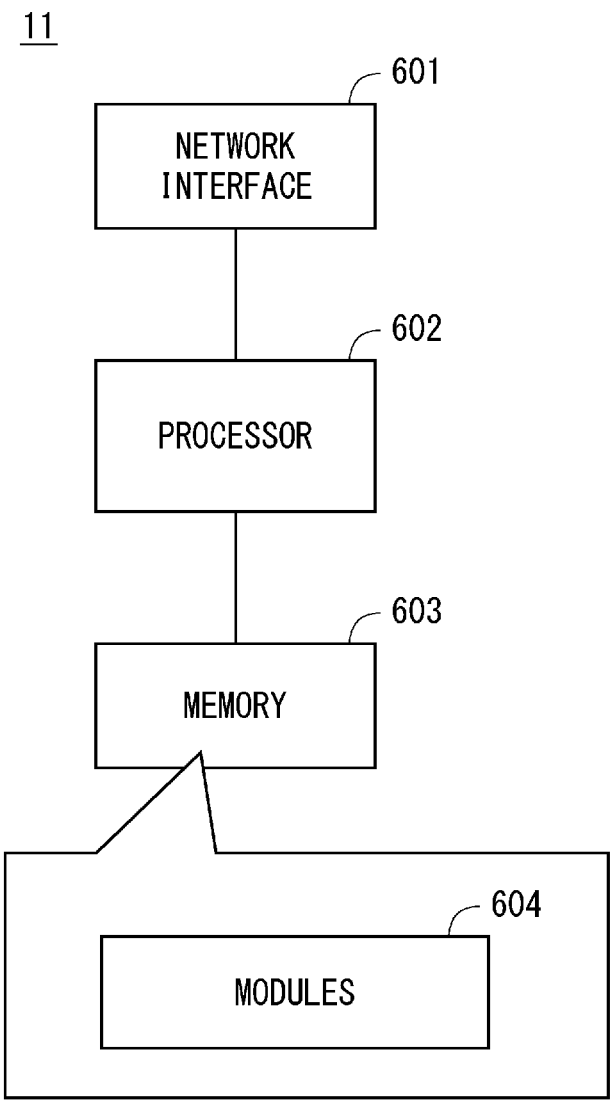
FIG. 6 is a block diagram showing a configuration example of a server according to embodiments.

The following provides configuration examples of the one or more servers in the network platform 1, and the UE 2 according to the above-described embodiments. FIG. 6 is a block diagram showing a configuration example of the PS server 11. The configurations of the other servers in the network platform 1 may be similar to that shown in FIG. 6. Referring to FIG. 6, the PS server 11 includes a network interface 601, a processor 602, and a memory 603. The network interface 601 is used to communicate with other servers (e.g., PS user database 12 and the SIP core 13) in the network platform 1, nodes (e.g., the P-GW 311, the PCRF 315, and the BM-SC 316) in the EPC 31 and the EPC 41, and other nodes. The network interface 601 may include, for example, a network interface card (NIC) conforming to the IEEE 802.3 series.

The processor 602 loads and executes software (computer programs) from the memory 603, thereby performing the processing of the PS server 11 described in the above embodiments. The processor 602 may be, for example, a microprocessor, a Micro Processing Unit (MPU), or a Central Processing Unit (CPU). The processor 602 may include a plurality of processors.

The memory 603 is composed of a volatile memory and a nonvolatile memory. The volatile memory is, for example, a Static Random-Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 603 may include a storage located apart from the processor 602. In this case, the processor 602 may access the memory 603 via the network interface 601 or an I/O interface (not illustrated).

The memory 603 may store one or more software modules (computer programs) 604 including instructions and data to perform the processing of the PS server 11 described in the above embodiments. In some implementations, the processor 602 may be configured to load the one or more software modules 604 from the memory 603 and execute the loaded software modules, thereby performing the processing of the PS server 11 described in the above embodiments.

Figure 7:
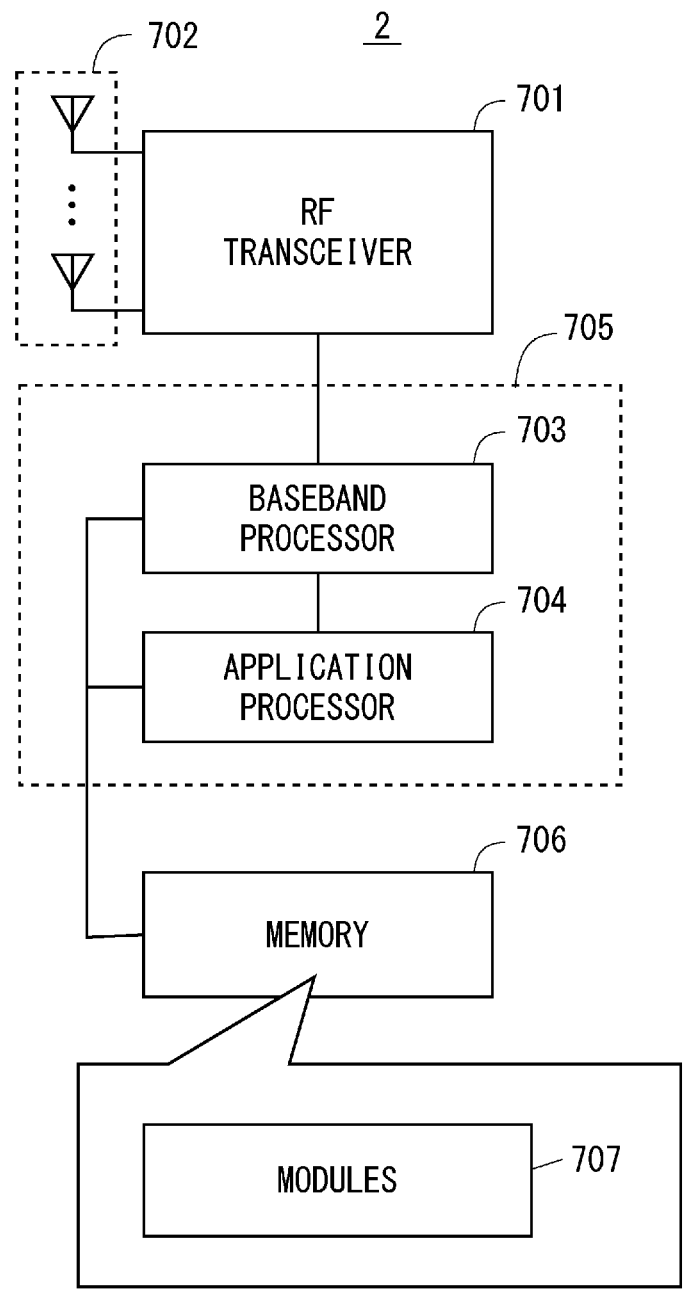
FIG. 7 is a block diagram showing a configuration example of a wireless terminal according to embodiments.

FIG. 7 is a block diagram showing a configuration example of the UE 2. A Radio Frequency (RF) transceiver 701 performs analog RF signal processing to communicate with the gNB 321. The RF transceiver 701 may include a plurality of transceivers. The analog RF signal processing performed by the RF transceiver 701 includes frequency up-conversion, frequency down-conversion, and amplification. The RF transceiver 701 is coupled to an antenna array 702 and a baseband processor 703. The RF transceiver 701 receives modulated symbol data (or OFDM symbol data) from the baseband processor 703, generates a transmission RF signal, and supplies the transmission RF signal to the antenna array 702. The RF transceiver 701 also generates a baseband received signal based on a received RF signal received by the antenna array 702 and supplies the baseband received signal to the baseband processor 703. The RF transceiver 701 may include an analog beamformer circuit for beam forming. The analog beamformer circuit includes, for example, a plurality of phase shifters and a plurality of power amplifiers.

The baseband processor 703 performs digital baseband signal processing (i.e., data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 703 may include, for example, signal processing of a Packet Data Convergence Protocol (PDCP) layer, a Radio Link Control (RLC) layer, a Medium Access Control (MAC) layer, and a Physical (PHY) layer. The control-plane processing performed by the baseband processor 703 may include processing of Non-Access Stratum (NAS) protocols, Radio Resource Control (RRC) protocols, and MAC Control Elements (CEs).

The baseband processor 703 may perform MIMO encoding and pre-coding for beam forming.

The baseband processor 703 may include a modem processor (e.g., Digital Signal Processor (DSP)) that performs the digital baseband signal processing and a protocol stack processor (e.g., a CPU or an MPU) that performs the control-plane processing. In this case, the protocol stack processor, which performs the control-plane processing, may be integrated with an application processor 704 described in the following.

The application processor 704 is also referred to as a CPU, an MPU, a microprocessor, or a processor core. The application processor 704 may include a plurality of processors (processor cores). The application processor 704 loads a system software program (Operating System (OS)) and various application programs (e.g., a call application, a WEB browser, a mailer, a camera operation application, and a music player application) from a memory 706 or from another memory (not illustrated) and executes these programs, thereby providing various functions of the UE 2.

In some implementations, as represented by a dashed line (705) in FIG. 7, the baseband processor 703 and the application processor 704 may be integrated on a single chip. In other words, the baseband processor 703 and the application processor 704 may be implemented in a single System on Chip (SoC) device 705. An SoC device may be referred to as a Large-Scale Integration (LSI) or a chipset.

The memory 706 is a volatile memory, a non-volatile memory, or a combination thereof. The memory 706 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 706 may include, for example, an external memory device that can be accessed from the baseband processor 703, the application processor 704, and the SoC 705. The memory 706 may include an internal memory device that is integrated in the baseband processor 703, the application processor 704, or the SoC 705. The memory 706 may also include a memory in a Universal Integrated Circuit Card (UICC).

The memory 706 may store one or more software modules (computer programs) 707 including instructions and data to perform the processing by the UE 2 described in the above embodiments. In some implementations, the baseband processor 703 or the application processor 704 may load these software modules 707 from the memory 706 and execute the loaded software modules, thereby performing the processing of the UE 2 described in the above embodiments with reference to the drawings.

The control-plane processing and operations performed by the UE 2 described in the above embodiments can be achieved by elements other than the RF transceiver 701 and the antenna array 702, i.e., achieved by the memory 706, which stores the software modules 707, and one or both of the baseband processor 703 and the application processor 704.

As described above with reference to FIGS. 6 and 7, each of the processors that the server (e.g., the PS server 11) and the UE 2 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

OTHER EMBODIMENTS

Each of the above-described embodiments may be used individually or two or more embodiments may be appropriately combined with one another.

The above-described embodiments have been described mainly for LTE systems (i.e., PS-LTE systems) that provide one or more public safety services. However, these embodiments may be applied to public safety systems that use cellular communication networks other than LTE.

Furthermore, the above-described embodiment may be applied to a public safety system using a plurality of cellular communication networks of different types. In one example, one of the cellular communication networks may be an LTE network and another one may be a non-LTE cellular communication network.

The above-described embodiments are merely examples of applications of the technical ideas obtained by the inventors. These technical ideas are not limited to the above-described embodiments and various modifications can be made thereto.

This application is based upon and claims the benefit of priority from Japanese Patent Application No. 2019-055095, filed on Mar. 22, 2019, the disclosure of which is incorporated herein in its entirety by reference.

REFERENCE SIGNS LIST

1 Network Platform
2 UE
3 First LTE Network
4 Second LTE Network
11 PS Server
12 PS User Database
13 SIP Core
31 EPC
32 E-UTRAN
41 EPC
42 E-UTRAN
602 Processor
603 Memory
703 Baseband Processor
704 Application Processor
706 Memory

What is claimed is:

1. A network platform comprising:
one or more servers configured to:
    be connected to both a core network of a first cellular communication network and a core network of a second cellular communication network;
    communicate with one or more applications running on each of a plurality of wireless terminals via the core network of the first cellular communication network or the core network of the second cellular communication network;
    obtain a load of the first cellular communication network;
    depending on the load of the first cellular communication network in comparison with a threshold, select from the first and second cellular communication networks a cellular communication network to be used by each wireless terminal to communicate with the network platform; and
    send to each wireless terminal a control message to prompt each wireless terminal to use the selected network.

2. The network platform according to claim 1, wherein the one or more servers are configured to:
receive from each wireless terminal an identifier of a cell or base station to which each wireless terminal belongs; and
determine, based on the identifier, a wireless terminal that should use the second cellular communication network instead of the first cellular communication network.

3. The network platform according to claim 1, wherein the load is a load of an enhanced packet core (EPC) network node.

4. The network platform of claim 3, wherein the EPC network node is a mobility management entity (MME) or a packet gateway (P-GW).

5. The network platform according to claim 1, wherein the load includes a load of a base station.

6. The network platform according to claim 1, wherein the one or more servers are configured to, in response to an increase in a load on a cell or base station in the first cellular communication network, make the selection so that one or more wireless terminals belonging to the cell or base station use the second cellular communication network.

7. The network platform according to claim 1, wherein
the first cellular communication network is a Public
Safety Long Term Evolution (PS-LTE) network, and
the second cellular communication network is a commercial LTE network.

8. The network platform according to claim 1, wherein the network platform is connected to a Packet Data Network Gateway in the core network of the first cellular communication network and a Packet Data Network Gateway in the core network of the second cellular communication network.

9. A method performed by a network platform comprising one or more servers, the method comprising:
   connecting to both a core network of a first cellular communication network and a core network of a second cellular communication network;
   communicating with one or more applications running on each of a plurality of wireless terminals via the core network of the first cellular communication network or the core network of the second cellular communication network;
   obtaining a load of the first cellular communication network;
   depending on the load of the first cellular communication network in comparison with a threshold, selecting from the first and second cellular communication networks a cellular communication network to be used by each wireless terminal to communicate with the network platform; and
   sending to each wireless terminal a control message to prompt each wireless terminal to use the selected network.

10. The method according to claim 9, further comprising receiving from each wireless terminal an identifier of a cell or base station to which each wireless terminal belongs, wherein
   said selecting comprises determining, based on the identifier, a wireless terminal that should use the second cellular communication network instead of the first cellular communication network.

11. The method according to claim 9, wherein the load is a load of an enhanced packet core (EPC) network node.

12. The method according to claim 9, wherein the load includes a load of a base station.

13. The method according to claim 9, wherein said selecting comprises, in response to an increase in a load on a cell or base station in the first cellular communication network, making the selection so that one or more wireless terminals belonging to the cell or base station use the second cellular communication network.

14. The method according to claim 9, wherein
the first cellular communication network is a Public Safety Long Term Evolution (PS-LTE) network, and
the second cellular communication network is a commercial LTE network.

15. A non-transitory computer readable medium storing one or more programs comprising computer readable instructions that, when loaded into one or more servers in a network platform, cause the one or more servers to perform a method comprising:
   connecting to both a core network of a first cellular communication network and a core network of a second cellular communication network;
   communicating with one or more applications running on each of a plurality of wireless terminals via the core network of the first cellular communication network or the core network of the second cellular communication network;
   obtaining a load of the first cellular communication network;
   depending on the load of the first cellular communication network in comparison with a threshold, selecting from the first and second cellular communication networks a cellular communication network to be used by each wireless terminal to communicate with the network platform; and
   sending to each wireless terminal a control message to prompt each wireless terminal to use the selected network.

16. The non-transitory computer readable medium according to claim 15, wherein the method further comprises receiving from each wireless terminal an identifier of a cell or base station to which each wireless terminal belongs,
   wherein said selecting comprises determining, based on the identifier, a wireless terminal that should use the second cellular communication network instead of the first cellular communication network.

17. The non-transitory computer readable medium according to claim 15, wherein the load is a load of an enhanced packet core (EPC) network node.

18. The non-transitory computer readable medium according to claim 15, wherein the load includes a load of a base station.

19. The non-transitory computer readable medium according to claim 15, wherein said selecting comprises, in response to an increase in a load on a cell or base station in the first cellular communication network, making the selection so that one or more wireless terminals belonging to the cell or base station use the second cellular communication network.

20. The non-transitory computer readable medium according to claim 15, wherein
the first cellular communication network is a Public Safety Long Term Evolution (PS-LTE) network, and
the second cellular communication network is a commercial LTE network.

* * * * *